(12) United States Patent
French et al.

(10) Patent No.: US 7,286,470 B1
(45) Date of Patent: Oct. 23, 2007

(54) MESSAGING SYSTEM FOR A PACKET TRANSPORT SYSTEM AND METHOD OF OPERATION THEREOF

(75) Inventors: Harry T. French, New York, NY (US); Mourad B. Takla, Basking Ridge, NJ (US)

(73) Assignee: Agere Systems Inc., Allentown, PA (US)

( * ) Notice: Subject to any disclaimer, the term of this patent is extended or adjusted under 35 U.S.C. 154(b) by 823 days.

(21) Appl. No.: 09/649,713

(22) Filed: Aug. 25, 2000

(51) Int. Cl.
*H04L 12/26* (2006.01)
*H04L 12/28* (2006.01)

(52) U.S. Cl. ...................... 370/230; 370/236

(58) Field of Classification Search ............... 370/419, 370/412; 709/208, 209, 210, 250
See application file for complete search history.

(56) References Cited

U.S. PATENT DOCUMENTS

| | | | | |
|---|---|---|---|---|
| 3,586,771 A * | 6/1971 | Hamburger et al. | ........... | 725/1 |
| 5,025,457 A * | 6/1991 | Ahmed | ........... | 375/354 |
| 5,541,926 A * | 7/1996 | Saito et al. | ........... | 370/474 |
| 5,717,855 A * | 2/1998 | Norman et al. | ........... | 709/250 |
| 5,732,286 A * | 3/1998 | Leger | ........... | 710/57 |
| 5,737,313 A * | 4/1998 | Kolarov et al. | ........... | 370/234 |
| 5,802,310 A * | 9/1998 | Rajaraman | ........... | 709/234 |
| 5,940,369 A * | 8/1999 | Bhagavath et al. | ........... | 370/229 |
| 5,982,772 A * | 11/1999 | Oskouy | ........... | 370/395.7 |
| 5,995,486 A * | 11/1999 | Iliadis | ........... | 370/229 |
| 6,016,513 A * | 1/2000 | Lowe | ........... | 709/250 |
| 6,222,825 B1 * | 4/2001 | Mangin et al. | ........... | 370/235 |
| 6,366,959 B1 * | 4/2002 | Sidhu et al. | ........... | 709/231 |
| 6,438,101 B1 * | 8/2002 | Kalampoukas et al. | ........... | 370/229 |
| 6,490,271 B1 * | 12/2002 | Erjanne | ........... | 370/347 |
| 6,532,243 B1 * | 3/2003 | Leijonhufvud | ........... | 370/503 |
| 6,578,101 B1 * | 6/2003 | Ahern | ........... | 710/306 |
| 6,581,164 B1 * | 6/2003 | Felts et al. | ........... | 713/400 |
| 6,601,105 B1 * | 7/2003 | Bell et al. | ........... | 709/232 |
| 2002/0172226 A1 * | 11/2002 | Staats | ........... | 370/503 |

OTHER PUBLICATIONS

Control Data® 6000 Series Computer Systems; Reference Manual; Section (1) "System Description"; pp. 1-1 & 1-4 and Section (4) "Peripheral and Control Processors"; pp. 4-1-4-6, 4-27.1-4-30 & 4-35-4-39.
Control Data® 6000 Series Computer Systems; Reference Manual; Section (1) "System Description"; pp. 1-1 & 1-4 and Section (4) "Peripheral and Control Processors"; pp. 4-1-4-6, 4-27.1-4-30 & 4-35-4-39, 1972.

* cited by examiner

*Primary Examiner*—Huy D. Vu
*Assistant Examiner*—Clemence Han

(57) ABSTRACT

A messaging system for facilitating communications between a master device and a slave device of a packet transport system, and a method of operation thereof. In one embodiment, the messaging system includes a channel level detector that reads a level of a first-in, first-out (FIFO) buffer of the slave device and compares the level to a threshold, and an event driven message generator that issues an event driven message to the master device when the level reaches the threshold.

18 Claims, 2 Drawing Sheets

MESSAGING SYSTEM FOR A PACKET TRANSPORT SYSTEM AND METHOD OF OPERATION THEREOF

TECHNICAL FIELD OF THE INVENTION

The present invention is directed, in general, to packet transport systems and, more specifically, to a messaging system employable in a packet transport system.

BACKGROUND OF THE INVENTION

Packet transport systems employ a technique of disassembling information at a sending end of a switching network for insertion into separate packets of data and reassembling the same information from the data packets at a receiving end of the switching network. Communications systems employing this technique are especially useful in common carrier or time-shared switching networks, since a communication path or circuit required for packet transmission associated with a user's message is needed only while each packet is being forwarded through the switching network. The communication path is, therefore, available to other users during intervening periods.

Packet transport systems are capable of providing integrated information transport services for a wide range of applications (e.g., interactive data, bulk data, signaling, packetized voice, image). Instead of designing specialized networks optimized for specific applications, many services can be simultaneously supported over the same connection to the switching network. User information of varying types is converted into packets. The switching network transports these packets between users. End users are not tied to fixed rate connections. Instead, the switching network adapts the connection rates to the particular needs of the end users. Furthermore, it is possible to create a uniform user-network interface that is applicable to a broad range of services. Different applications may require different grades of service from the switching network. For example, packetized voice transmissions may possess very stringent delay requirements for delivery of the packets associated with an ongoing voice conversation, thus providing the users with acceptable quality of service.

A packet transport system generally includes a number of devices, wherein one device may be designated as a slave device that provides an interface to the switching network. A second device may be designated as a master device that provides the data (in the form of packets) to the slave device and performs buffer management of the slave device. A problem may arise when the slave device depletes the data at a rate different from that expected by the master device. This may cause exception conditions to occur. The exception conditions may include overflow, underflow, abort of transmission or loss of data.

While the slave device typically runs at a line rate, i.e., a rate of a physical device of the switching network, the master device typically runs at a rate determined by a system clock thereof. The line rate and the rate (or frequency) of the system clock may be derived from the same source or from different sources. In either case, variations in the line rate or the frequency of the system clock, over time, may cause the slave device and the master device to run at different rates. Additionally, some protocols (e.g., the High-Level Data Link Control (HDLC) protocol) may require the slave device to insert control bits, stuffing bits, or error checking bits such that the amount of data transmitted by the slave device is greater than the amount of data provided to the slave device by the master device.

To accommodate the varying rates, some currently available 20 packet transport systems employ separate interfaces designed to carry information that is necessary for communication between the various devices within the system. In systems having only a small, limited number of channels (for instance, 31 channels) a separate indicator or line may be employed for each channel. Since each channel requires a separate line (with its attendant circuitry), this generally results in devices (e.g., slave and master devices) having increased pin count, circuit pack area and power consumption.

Other packet transport systems employ scheduling techniques, wherein multiple data packets are scheduled in advance for every data channel. This technique, however, does not discriminate between low and high priority packets and thus does not allow the higher priority packets to be transmitted first so as to minimize delay. Further, to avoid data underrun, data queues employed by the packet transport system may need to be filled with lower priority data packets. As a result, the higher priority data packets may be subject to unnecessary delays.

Still other packet transport systems completely eliminate the need for storage in the slave device by requiring the master device to send a limited number of bytes (usually between four and eight) to every channel in the slave device. The master device, however, has to poll the slave device at a much higher rate than that normally required. Additionally, the master device should monitor clock variations in the slave device, as well as the status of a buffer for each channel in the slave device.

Accordingly, what is needed in the art is a messaging system for communications between the slave device and the master device that overcomes the deficiencies of the prior art.

SUMMARY OF THE INVENTION

To address the above-discussed deficiencies of the prior art, the present invention provides a messaging system for facilitating communications between a master device and a slave device of a packet transport system, and a method of operation thereof. The master device transmits packets to the slave device.

In one illustrative embodiment of the present invention, the messaging system includes (1) a channel level detector that reads a level of a first-in, first-out (FIFO) buffer of the slave device and compares the level to a threshold, and (2) an event driven message generator that issues an event driven message to the master device when the level reaches the threshold. The master device may thus adjust a rate at which the master device provides the packets to the slave device based on the event driven message to avoid an exception condition.

In another embodiment of the present invention, the messaging system includes (1) an aggregate level detector that determines storage levels of a plurality of channels associated with the slave device and (2) a periodic message generator that periodically issues to the master device a periodic message indicating the storage levels. The messaging system may thus provide the master device with status of at least a group of channels associated with the slave device.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
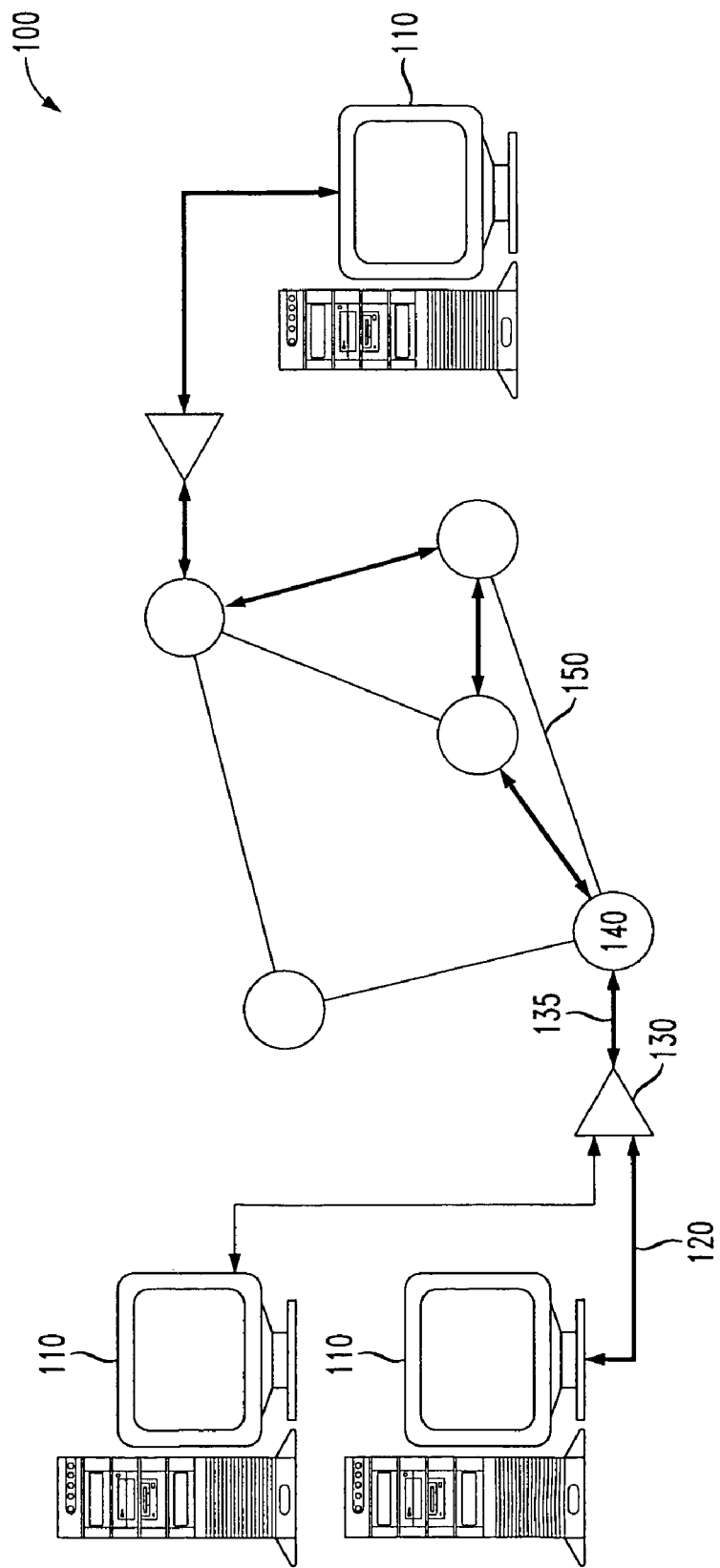
FIG. 1 illustrates an embodiment of a packet switching network that provides an environment for the present invention.

Referring initially to FIG. 1, illustrated is an exemplary embodiment of a packet switching network 100 that provides an environment for the present invention. The packet switching network 100 is arranged for establishing virtual circuit connections between terminal equipment, one of which is designated 110. The terminal equipment 110 transmit packets of data (containing information such as packetized voice) through connection lines, one of which is designated 120, to a packet multiplexer 130. While the terminal equipment 110 are illustrated as computer terminals, those skilled in the art understand that the terminal equipment 110 may include devices capable of operating with digitized voice, video or data.

A resulting output stream of packets, illustratively interspersed with one another, are transmitted from the packet multiplexer 130 over an access line 135 to a node 140 of the packet switching network 100. Other links (one of which is designated 150) also transmit streams of data packets into the node 140. Some of these links may originate at a multiplexer (such as the packet multiplexer 130), while others may originate at high speed terminal equipment. The packet switching network 100 typically includes a large number of nodes 140, interconnected via a large number of links 150.

Illustrated is an exemplary virtual connection, shown by a heavily weighed path line linking one of the terminal equipment 110 to another of the terminal equipment 110. Transmission is illustratively bidirectional over such a virtual connection.

Figure 2:
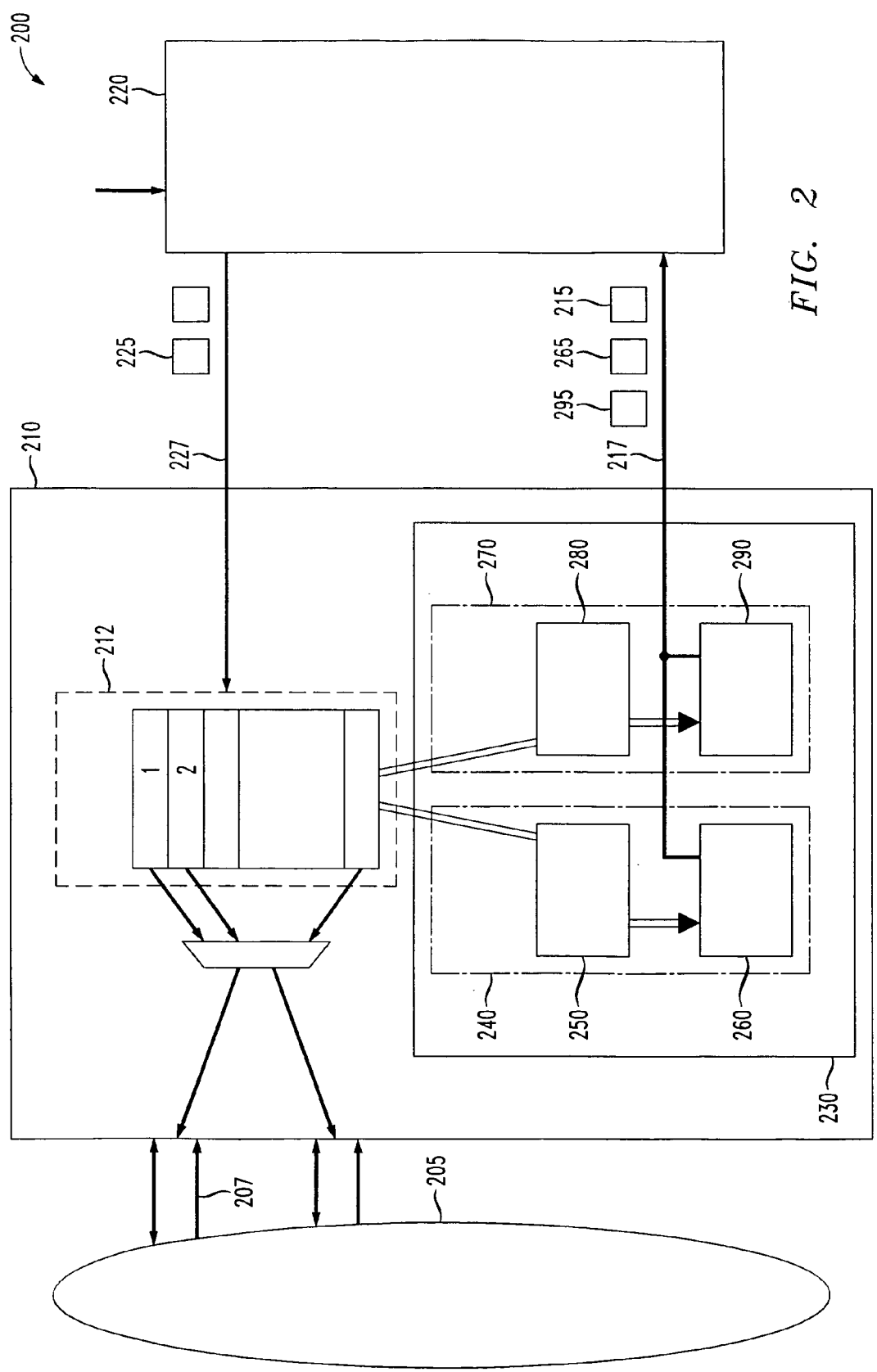
FIG. 2 illustrates an embodiment of a packet transport system constructed in accordance with the principles of the present invention.

Turning now to FIG. 2, illustrated is an exemplary embodiment of a packet transport system 200 constructed in accordance with the principles of the present invention. The illustrative packet transport system 200 includes a slave device 210 that provides a network interface to a packet switching network 205, which may be an asynchronous transfer mode (ATM) network. The packet transport system 200 further includes a master device 220 that provides data, which may be in the form of transmit packets (one of which is designated 225), to the slave device 210 via a transmit interface 227. The master device 220 also manages a packet storage buffer 212 of the slave device 210 in an attempt to avoid exception conditions, such as overflow, underflow, abort of transmission or loss of data. The slave device 210 in turn provides data, which may be in the form of receive packets (one of which is designated 215), to the master device 220 via a receive interface 217.

The slave device 210 is coupled to the packet switching network 205 and receives clock signals (one of which is designated 207) therefrom. While the slave device 210 typically runs at a rate determined by the clock signals 207 from the packet switching network 205, the master device 220 may run at a rate determined by its own internal system clock. The clock signals 207 from the packet switching network 205 and the master device's 220 internal system clock may be derived from the same source or from different sources. In either case, variations can occur that will cause the slave device 210 and the master device 220 to run at different rates, which may result in the exception conditions previously discussed.

The packet transport system 200, therefore, further includes a messaging system 230 for facilitating communications between the master device 220 and the slave device 210. In the illustrated embodiment, the messaging system 230 includes both an event driven messaging subsystem 240 and a periodic messaging subsystem 270. Of course, in other embodiments, the messaging system 230 may include only one of the event driven messaging subsystem 240 or the periodic messaging subsystem 270 and remain well within the scope of the present invention.

The event driven messaging subsystem 240 includes a channel level detector 250 that, in the illustrated embodiment, is associated with the slave device 210. The event driven messaging subsystem 240 further includes an event driven message generator 260, which, in the illustrated embodiment, is also associated with the slave device 210. The channel level detector 250 and the event driven message generator 260 may be incorporated within the slave device 210 or, alternatively, may be external to the slave device 210 and remain well within the scope of the present invention.

Further, while the illustrated embodiment only shows one channel level detector 250, those skilled in the pertinent art will realize that the event driven messaging subsystem 240 may employ a separate channel level detector 250 for each channel of the slave device 210 or, alternatively, may employ one channel level detector 250 for at least a group of channels of the slave device 210. In -other embodiments, the messaging subsystem 240 may employ a channel level detector 250 for multiple slave devices 210. In either case, the per channel level detector 250 is configured to read a level of a first-in, first-out (FIFO) buffer (of the packet storage buffer 212) associated with a particular channel of the slave device 210. Likewise, the event driven messaging subsystem 240 may employ a separate event driven message generator 260 for each channel of the slave device 210, for a group of channels of the slave device 210, or for a number of slave devices 210.

The event driven messaging subsystem 240 operates as follows. The channel level detector 250 reads a level of a FIFO buffer associated with a channel of the slave device 210 and compares the level to a threshold, which may be user selectable. The threshold may be set such to avoid a particular exception condition such as underflow. In this case, when the level of the FIFO buffer decreases to or below the threshold, the event driven message generator 260 will issue an event driven message 265 to the master device 220. In response, the master device 220 may transmit a number of packets (transmit packets 225) to the slave device 210, which may be designated for the particular channel, to avoid the underflow condition on that channel.

In an advantageous embodiment, the channel level detector 250 may compare the level of the FIFO buffer to multiple thresholds and cause the event driven message generator 260 to issue different event driven messages 265 to the master device 220 based on the threshold reached by the FIFO buffer. For example, the channel level detector may compare the level of the FIFO buffer to both an upper and a lower threshold. The event driven message generator 260 may then send an event driven message 265 to the master device 220 to request more transmit packets 225 when the level reaches the lower threshold, or request the master device 220 to temporarily suspend the sending of transmit packets 225 to the particular channel when the level reaches the upper threshold. Those skilled in the pertinent art are familiar with the various exception conditions and their relationship to various threshold levels.

The event driven message may be transmitted in band, along with the data, to eliminate the need for a separate interface between the master device and the slave device. Pin counts of both the master device and the slave device may thus be advantageously reduced. The master device and the slave device may employ a Utopia-like interface, with the event driven message transmitted across a local interface between the master device and the slave device.

The periodic messaging subsystem 270 includes an aggregate level detector 280 that, in the illustrated embodiment, is associated with the slave device 210. The periodic messaging subsystem 270 further includes a periodic message generator 290, which, in the illustrated embodiment, is also associated with the slave device 210. The aggregate level detector 280 and the periodic message generator 290 may be incorporated within the slave device 210 or, alternatively, may be external to the slave device 210 and remain well within the scope of the present invention.

In the illustrated embodiment, one aggregate level detector 280 is employed per slave device 210. Of course, the slave device 210 may employ more than one aggregate level detector 280, or multiple slave devices 210 may employ only one aggregate level detector 280 and remain well within the scope of the present invention. Regardless, the aggregate level detector 280 is configured to determine storage levels of a plurality of channels associate with the slave device 210. Likewise, the periodic messaging subsystem 290 may employ one or more separate periodic message generators 290 for each slave device 210, or may, alternatively, employ only one periodic messaging subsystem 290 for a plurality of slave devices 210.

The periodic messaging subsystem 270 operates as follows. Periodically, the aggregate level detector 280 reads storage levels of a group of FIFO buffers associated with a corresponding group of channels (associated with packet storage buffer 212) of the slave device 210. The periodic message generator 290 then issues a periodic message 295 to the master device 220, which indicates the storage levels. In the illustrated embodiment, the periodic message 295 may be embodied in a single packet to minimize an amount of traffic between the slave device 210 and the master device 220. Of course, the periodic message 295 may be in the form of multiple packets and remain well within the scope of the present invention.

Upon receipt of the periodic message 295, the master device 220 may decide to transmit a number of additional packets (transmit packets 225) or, alternatively, may refrain from transmitting any additional transmit packets 225 for a period of time. The periodic message 295 may include information pertaining to each individual channel associated with the slave device 210 to allow the master device 220 to distinguish the channel(s) that may require more transmit packets 225 from those that do not require more transmit packets 225 at a particular time. By employing the periodic messages 295, the master device 220 may regulate the amount of transmit packets 225 sent to each channel of the slave device 210, or the number of transmit packets 225 sent to the slave device 210 in general, thereby minimizing the occurrence of exception conditions such as underflow.

Those skilled in the art should understand that the previously described embodiment of the messaging system are submitted for illustrative purposes only and other embodiments are well within the scope of the present invention.

Although the present invention has been described in detail, those skilled in the art should understand that they can make various changes, substitutions and alterations herein without departing from the spirit and scope of the invention in its broadest form.

The invention claimed is:

1. For use with a packet transport system associated with a switching network and having a master device and a slave device that transmits packets therebetween over a local interface, a messaging system for facilitating communications between said master device and said slave device, comprising:
    an event driven messaging subsystem, including:
        a channel level detector that reads a level of a first-in, first-out (FIFO) buffer of said slave device and compares said level to a threshold, said slave device providing a network interface to said switching network for said master device, and
        an event driven message generator that issues an event driven message to said master device when said level reaches said threshold; and
    a periodic messaging subsystem, including:
        an aggregate level detector that determines storage levels of a plurality of channels associated with said slave device, and
        a periodic message generator that periodically issues to said master device over said local interface a periodic message indicating said storage levels, said master device controlling transmission of packets to said slave device based on at least one of said event driven message and said periodic message.

2. The messaging system as recited in claim 1 wherein at least one of said event driven message and said periodic message is transmitted in band with packets transmitted from said slave device to said master device.

3. The messaging system as recited in claim 1 wherein packets transmitted to said master device are packets received by said slave device over said switching network.

4. The messaging system as recited in claim 1 wherein said switching network is an asynchronous transfer mode (ATM) network.

5. The messaging system as recited in claim 1 wherein said master device transmits additional packets to said slave device based on at least one of said event driven message and said periodic message.

6. The messaging system as recited in claim 1 wherein said master device suspends transmission of packets to said slave device based on at least one of said event driven message and said periodic message.

7. The messaging system as recited in claim 1 wherein said periodic message is contained in a single packet.

8. The messaging system as recited in claim 1 wherein said periodic message enables said master device to determine a variation between a first clock associated with said slave device and a second clock associated with said master device.

9. For use with a packet transport system associated with a switching network and having a master device and a slave device that transmits packets therebetween over a local interface, a method for facilitating communications between said master device and said slave device, comprising:
    generating an event driven message, including:
        reading a level of a first-in, first-out (FIFO) buffer associated with a channel of said slave device, said slave device providing a network interface to said switching network for said master device, comparing said level to a threshold, and issuing an event driven message to said master device when said level reaches said threshold; and alternatively generating a periodic message, including:

determining storage levels of a plurality of channels associated with said slave device, and periodically issuing to said master device a periodic message over said local interface indicating said storage levels, said master device controlling transmission of packets to said slave device based on at least one of said event driven message and said periodic message.

10. The method as recited in claim 9 wherein said issuing comprises transmitting said event driven message in band with packets transmitted from said slave device to said master device.

11. The method as recited in claim 9 wherein said periodically issuing comprises transmitting said periodic message in band with packets transmitted from said slave device to said master device.

12. The method as recited in claim 9 wherein said packets transmitted to said master device are packets received by said slave device over said switching network.

13. The method as recited in claim 9 wherein said periodically issuing comprises transmitting said periodic message out of band.

14. The method as recited in claim 9 wherein said switching network is an asynchronous transfer mode (ATM) network.

15. The method as recited in claim 9 wherein said master device transmits additional packets to said slave device based on at least one of said event driven message and said periodic message.

16. The method as recited in claim 9 wherein master device suspends transmission of packets to said slave device based on at least one of said event driven message and said periodic message.

17. The method as recited in claim 9 wherein said periodic message is contained in a single packet.

18. The method as recited in claim 9 wherein said periodic message enables said master device to determine a variation between a first clock associated with said slave device and a second clock associated with said master device.

\* \* \* \* \*